May 15, 1962 LYDIE KOCH BORN MIRAMOND ET AL 3,035,173
NEUTRON DETECTORS
Filed April 3, 1957
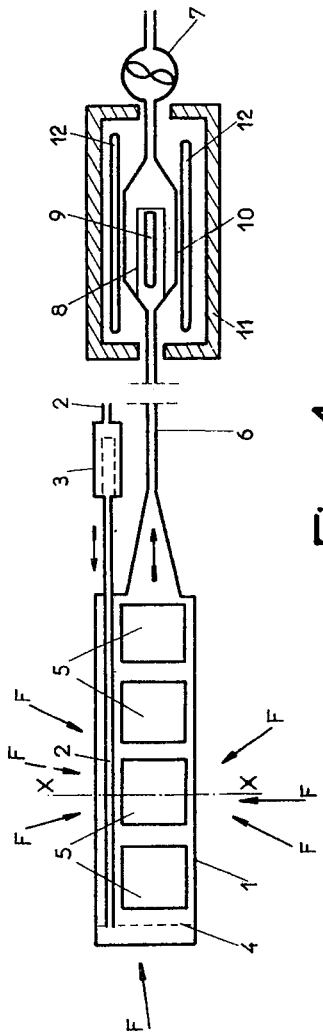
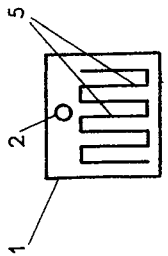
Fig. 1
Fig. 2

United States Patent Office 3,035,173
Patented May 15, 1962

3,035,173
NEUTRON DETECTORS
Lydie Koch, born Miramond, and Jacques Labeyrie, Paris, France, assignors to Commissariat a l'Energie Atomique, Paris, France, a French state administration
Filed Apr. 3, 1957, Ser. No. 650,475
Claims priority, application France Apr. 9, 1956
3 Claims. (Cl. 250—83.1)

The present invention relates to neutron detectors.

Its object is to facilitate the detection of neutrons mixed with an intensive gamma ray flux.

Our invention is essentially characterized in that a gaseous stream is caused to flow through a chamber subjected to the action of the neutron flux to be detected, said chamber containing a target which carries a layer of a fissionable material, said gaseous stream being capable of conveying the fission products resulting from the bombardment of the target by the neutrons, through a conduit, to a device for measuring the radioactivity of these products, this device being located at a substantial distance from the undesirable direct flux of rays which accompanies the neutron flux to be detected.

It is known that the detection of neutrons mixed with an intensive gamma ray flux (as it is the case, for instance, in a nuclear reactor or in the vicinity of an accelerator) requires special apparatus among which may be cited compensated ionization chambers, fission chambers and boron fluoride counters.

Compensated ionization chambers include two ionization chambers placed in opposition, one of them being sensitive only to gamma rays, the other being sensitive both to neutrons and to gamma rays. The electrodes of this last mentioned chamber are generally covered with $B_4C$ enriched with $B^{10}$.

Fission chambers are ionization chambers of a special type one electrode of which is covered with a fissionable material. Under the effect of a neutron flux, this fissionable material is disintegrated and releases electrically charged products which are capable of ionizing the gas of the chamber.

Gaseous boron fluoride counters are based upon the known reaction of neutrons with $B^{10}$

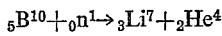
$$_5B^{10} + _0n^1 \rightarrow _3Li^7 + _2He^4$$

The alpha particle and the lithium nucleus convey a total energy of 2.4 mev. which causes ionization of the gas.

Unfortunately these three kinds of apparatus have some specific drawbacks which make them difficult to use.

Compensated ionization chambers are delicate to manufacture and their electronic layout is relatively complicated (they require measurement of a very low direct current by means of an electrometer tube and of a very high resistance). Furthermore they give rise to systematic errors during measurements made in a slow neutron nuclear reactor working at low power, these errors resulting from an insufficient compensation of the ionization currents due to gamma rays.

The conventional fission chambers have the very serious drawback of being sensitive to the natural radioactivity of all materials such as $U^{235}$, $U^{238}$, Th, and so on, which are fissionable under the influence of neutrons of an energy lower than said mev. Due to this, the measurements they give are not accurate.

Boron fluoride counters are very expensive to manufacture and their use in a high flux of gamma rays is delicate.

In order to obviate these drawbacks we make use, according to the present invention, of a neutron detector in which the fission products due to the action of the neutron flux upon a target of fissionable material are conveyed by a suitable gas stream to a radiation counter which is thus capable of measuring the radioactivity of these products at a suitable distance from the parasitic fluxes, in particular the gamma ray flux, which accompany the flux of neutrons to be detected.

Generally, the radioactivity that is thus measured is an emission of beta rays but it may also be an emission of gamma rays or of neutrons. It is due to fission nuclei emitted by the target when it is bombarded by neutrons and which disintegrate in flight close to the detector. We may increase the sensitiveness of the device by holding back a portion of these nuclei, for instance by means of a filter located in the vicinity of the detector or by reducing their velocity as they are passing in this vicinity, for instance by locally increasing the cross-section of the gas conveying conduit.

The fissionable material that is used may be of any kind (uranium 238, 235, 233, plutonium, thorium, etc.). The only requirement is that this material must undergo nuclear fission under the action of the neutron flux to be measured. For detecting thermal neutrons for instance, it is advantageous to make use of natural uranium more or less enriched with $U^{235}$. The thickness of the layer of fissionable material is not critical. However it is not of advantage to give it a value greater than 4 microns since this distance corresponds to the maximum range of the fission products in the fissionable material. It is possible to check up experimentally whether the indications of the counter are proportional to the total area of the deposit of fissionable material exposed to the radiations, and also, other things being equal, to the flux of neutrons that is received.

The radiation counter is of any suitable type. It may be a proportional counter, a Geiger counter or a scintillation counter. This counter may be placed at a distance of several meters from the source of neutrons to be measured, which permits of eliminating any possible action thereon of the gamma rays mixed with the neutrons and of the alpha particles emitted by the fissionable material.

The electrical impulses coming from the counter are generally recorded, by means of a counting scale or of an integrator. We may also, in order to distinguish it from another radiation, select by means of a spectrographic device, one or several characteristic radiations emitted by the fission products.

The conveying gas that is used must be relatively little activated by neutrons. For instance, air, carbonic gas or nitrogen are suitable for this purpose. It is not necessary to keep the flow rate of the gaseous stream at a constant value during a series of measurements.

The conduit which connects the fission chamber with the detector may be of any material whatever. However it is advantageous, in view of the ions which may be conveyed by the gas, to make it of a material which is a good conductor of electricity, in order to avoid a capture by electrostatic effect of the fission particles on the wall of the conduit.

The gamma rays mixed with the neutrons to be measured produce, like these neutrons, fissions of the uranium nuclei (photofission). However this effect is of relatively little intensity, at least when the neutron flux to be measured comes from a nuclear reactor, and it passes undetected by the counter in comparison with the fissions produced by the neutrons. As a matter of fact, this photofission of natural uranium is characterized by a resonance line for an energy of the incident gamma rays equal to 17.5 mev. On the other hand, the cross sections for fission of natural uranium respectively by thermal neutrons and by 8 mev. gamma rays are in the ratio of about 1000:1. As the spectrum of the gamma flux of a nuclear reactor is substantially uniform and ranges from 0 to 8 mev., the apparatus is consequently at least 1000 times more sensitive to the action of thermal neutrons than to that of gamma rays.

Finally, the new neutron detector according to our invention is easy to manufacture and the electronic layout that it involves is quite conventional since it corresponds to the measurement of a radioactivity.

Preferred embodiments of our invention will be hereinafter described with reference to the accompanying drawings, given merely by way of example and in which:

FIG. 1 is a diagrammatic general view of the apparatus.

FIG. 2 is a section on the line X—X of the fission chamber of FIG. 1.

In the apparatus illustrated by FIG. 1, chamber 1 is supposed to be made of aluminium. This metal is particularly suitable in view of its low cross section for thermal neutron absorption and also of the low period of the products resulting from its activation.

FIG. 1 shows the inlet conduit 2 for the conveying gas, said gas consisting for instance of air purified by means of a large area filter 3 the stopping power of which, defined for methylene blue, is 99.95%. A grid 4, for instance a metallic grid, ensures a uniform distribution of the gaseous streams flowing along the aluminium plates 5 carrying, in the example that is described, a deposit of uranium oxide $UO_2$.

FIG. 2 shows a particular arrangement of plates 5 in chamber 1 in order to increase as much as possible the total area to be irradiated.

The total area of these plates 5 is, in this example, 1 sq. meter, upon which has been deposited a total amount of uranium of 21.6 g., corresponding to a uniform deposit of 2.5 mg./sq. cm. of uranium oxide $UO_2$. In this particular example, the number of fissions per sq. cm. and per second resulting from a flux $\Phi$ of thermal neutrons is $22.16^{-6} \Phi$ ($\Phi$ being the number of neutrons per. sq. cm. and per second).

Chamber 1 and plates 5 are subjected to the neutron flux to be measured, diagrammatically shown by the arrows F. The resulting solid and gaseous fission products (beta and gamma rays) are carried along, according to the invention, by the air stream flowing through conduit 6 and they are sucked in by pump 7 through filter 8. A Geiger counter 9 detects the beta and gamma rays present in the air stream, and filter 8, which stops the solid fission products, permits of increasing the sensitivity of the apparatus to very low fluxes.

In conduit 6 the fission products are caused to flow at high velocity. This velocity is reduced when the products are passing in front of counter 9 in order to increase the probability of their disintegration during this passage. Conduit 6 is therefore provided with an enlarged portion 10 the cross section of which is, in the example that is described, fifty times that of conduit 6.

The radiation counter 9 is protected by a lead casing 11 against parasitic gamma rays. In the particular case where it is desired to measure very low fluxes, it is possible to eliminate the effect of high energy particles of cosmic origin by proceeding as follows: the radiation counter 9 is surrounded by a ring of "cosmic counters" 12 (Geiger counters having thick walls) mounted in anti-coincidence with counter 9. In these conditions, any particle of cosmic origin which produces a count simultaneously in the central counter 9 and in one of the counters 12 is not counted. This arrangement permits of reducing the "background count" of the central counter 9 (indication given by this counter 9 under the effect of the natural radioactivity existing on the surface of the earth) from 20 to 4.5 counts per minute. However, account should be taken of the fact that the radon and its derivatives present in the atmospheric air used for conveying the fission products to the counter supply 1.5 counts per minute in supplement, due to the accumulation of solid radioactive products on filter 8 when air is sucked in at the rate of two liters per second for 30 minutes.

In order to calibrate the apparatus, we used a neutron source (radium-beryllium mixture) of 70 mc. and the mean flux $\Phi$ of thermal neutrons in the volume occupied by the fission chamber, preliminarily measured by means of a boron fluoride counter including 90% of $B^{10}$, was 70 per sq. cm. and per second. Chamber 1 and the radiation counter 9 were at a distance of two meters from each other. The maximum output obtained in these conditions is 12.5%, that is to say there is measured an activity due to the fission products of 12.5 counts per second for 100 fissions per second.

The sensitivity of the apparatus may be calculated by determining the flux of neutrons necessary to give an indication equal to twice its background count. In the case of a thin wall counter, surrounded by a filter and protected by 10 cm. of lead but without cosmic counters mounted around it, the indication was 40 counts per minute (twice the background count) for a thermal neutron flux of 15 per sq. cm. and per second. If, in addition to this, a set of cosmic counters 12 were mounted around the central counter 9 in anti-coincidence connection therewith, a thermal neutron flux of 4 per sq. cm. and per second was sufficient to obtain a count equal to twice the background count.

The sensitivity of the detector according to our invention to the gamma rays mixed with the neutron flux to be measured was studied in the following manner: chamber 1, first wholly surrounded by a cadmium sheath (to absorb neutrons) 0.7 mm. thick, was introduced into the channel of a nuclear reactor at rest. The thermal neutron flux in the volume occupied by the chamber, preliminarily measured by means of a manganese detector, was $1.3.10^6$ per sq. cm. and per second and the gamma ray flux was $2.10^5$ roentgens per eight hours. The distance of chamber 1 from the radiation counter 9 was six meters, the air flow rate was 9.5 liters per second.

The background count of the counter in the hall of the reactor being 5 counts per second, when suction was exerted through the detector coated with cadmium, the activity that was measured was about six counts per second. Therefore only one count per second was due to photofissions produced by the gamma rays coming either from the reactor or from the reaction (n, $\gamma$) of cadmium under the action of neutrons.

Without the cadmium wrapping, the activity reached 1500 counts per second. The counting error due to gamma rays is therefore negligible, despite the high value of their flux, whereas, in the same conditions, a compensated ionization chamber would deliver a current due to the gamma rays 25 times higher than that due to the neutrons.

This apparatus therefore permits of performing thermal neutron flux measurements in a very important flux of gamma rays, which is the case for instance inside nuclear reactors. It further permits of tracing neutron density diagrams with a high precision since, in a neutron flux of $10^{12}$ per sq. cm. and per second, a detector surface of 1 sq. mm. would be sufficient to ensure accurate measurements within a short time (such a flux would give about 1000 impulses per second with such a target area in an apparatus such as above described).

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A neutron detector for measuring the thermal neutron density of a neutron flux mixed with an intensive gamma ray flux, comprising, in combination, a fission chamber containing a target and a layer of fissionable material on said target, a radiation counter spaced from said fission chamber, an electrically conductive conduit connecting said fission chamber and radiation counter, said conduit having a length preventing gamma rays and alpha particles leaving said fission chamber to reach said radiation counter, and means to pass a radiation inert gas of low neutron absorbing cross section through said fission chamber, conduit and radiation counter, said gas sweeping fission products, emitted by the fissionable material of the fission chamber by the action of the neutron flux, into said radiation counter.

2. A neutron detector according to claim 1 further including means for reducing the velocity of the gaseous stream as it is passing through said radiation counter.

3. A neutron detector according to claim 1 further including a filter in said conduit located in the vicinity of the radiation counter for stopping at least a portion of the fission products carried by the conveying gas stream.

References Cited in the file of this patent
UNITED STATES PATENTS

| | | |
|---|---|---|
| 2,462,471 | Crumrine | Feb. 22, 1949 |
| 2,506,419 | Graves | May 2, 1950 |
| 2,595,622 | Wiegand | May 6, 1952 |
| 2,599,922 | Kanne | June 10, 1952 |
| 2,652,497 | Miller | Sept. 15, 1953 |
| 2,741,592 | Borst et al. | Apr. 10, 1956 |
| 2,809,313 | Baer et al. | Oct. 8, 1957 |